US007453808B2

United States Patent
Qureshi et al.

(10) Patent No.: US 7,453,808 B2
(45) Date of Patent: Nov. 18, 2008

(54) THROTTLING NETWORK MANAGEMENT AND ELEMENT MANAGEMENT SYSTEM MESSAGING

(75) Inventors: Rashid Qureshi, Ottawa (CA); Robert Craig, Kanata (CA); Robert de Vlugt, Carp (CA)

(73) Assignee: Alcatel Lucent, Paris (FR)

( * ) Notice: Subject to any disclaimer, the term of this patent is extended or adjusted under 35 U.S.C. 154(b) by 776 days.

(21) Appl. No.: 10/813,300

(22) Filed: Mar. 31, 2004

(65) Prior Publication Data

US 2005/0220020 A1    Oct. 6, 2005

(51) Int. Cl.
*H04J 1/16* (2006.01)
(52) U.S. Cl. ...................................... 370/235; 370/412
(58) Field of Classification Search ................. 370/229, 370/230, 231, 232, 233, 234, 235, 395.21, 370/395.41, 395.42, 412, 428, 429
See application file for complete search history.

(56) References Cited

U.S. PATENT DOCUMENTS

| | | | |
|---|---|---|---|
| 6,115,356 A * | 9/2000 | Kalkunte et al. ............ 370/229 |
| 6,292,492 B1 * | 9/2001 | Bonomi et al. .............. 370/415 |
| 6,363,421 B2 | 3/2002 | Barker | |
| 6,400,683 B1 * | 6/2002 | Jay et al. ..................... 370/229 |
| 6,564,341 B1 | 5/2003 | Sundaram | |
| 6,715,007 B1 * | 3/2004 | Williams et al. .............. 710/52 |
| 6,741,559 B1 * | 5/2004 | Smeulders et al. .......... 370/230 |
| 2002/0116485 A1 | 8/2002 | Black | |
| 2002/0120730 A1 | 8/2002 | Goudzwaard | |
| 2003/0067877 A1 * | 4/2003 | Sivakumar et al. .......... 370/232 |
| 2004/0032827 A1 * | 2/2004 | Hill et al. .................... 370/229 |

* cited by examiner

*Primary Examiner*—Ricky Ngo
*Assistant Examiner*—Kan Yuen

(57) ABSTRACT

A system and method are provided for throttling event messages to be sent to a network management system (NMS), so as to avoid overflow of element management system (EMS) buffers. Three states are defined for buffers within a proxy: low, high, and full. Changes between states occur as the fill-level of the buffers crosses thresholds. When the proxy buffers are in the low state, the event logger of an EMS forwards all event messages to the proxy, which are then forwarded to the NMS. When the proxy buffers are in the high state, the EMS only forwards high priority messages to the proxy. Low priority messages are stored within the EMS. When the proxy buffers are in a full state, the EMS does not forward any messages to the proxy. In this way, event messages are throttled, thereby reducing the frequency of network reconciliation, in a way which does not further burden the Qs channel process.

20 Claims, 4 Drawing Sheets

THROTTLING NETWORK MANAGEMENT AND ELEMENT MANAGEMENT SYSTEM MESSAGING

FIELD OF THE INVENTION

The invention relates to network management systems within telecommunication networks, and more particularly to throttling of messages between a network management system and element management systems.

BACKGROUND OF THE INVENTION

In network management, element management (EM) systems can be used as intermediary systems between network elements (such as telecommunication nodes) and a network management (NM) system. Each EM system is responsible for managing a respective collection of network elements. When the status of a network element changes, the network element send messages to its respective EM system. The EM system queues messages received from network elements in buffers, and forwards them to the NM system over a reliable communication channel using a Qs channel process. The EM system also generates its own messages, which are sent to the NM system. However, the EM system generated messages are few in number relative to the network element generated messages. The rate at which the EM system sends messages to the NM system is therefore only slightly greater than the aggregate rate at which the collection of network elements sends messages to the EM system.

When the EM system receives a message from a network element, a message logger stores the message in a buffer until delivery of the message to the NMS is confirmed. One method of storing and forwarding messages is to use a proxy. A proxy is a software process running in association with the EM system. The proxy is responsible for the Qs channel process, which ensures reliable delivery of messages to the NS system. When the EM system receives a message from a network element, it sends the message to the proxy. When the proxy receives the message, a SEND process is initiated. The SEND process translates the message into a format recognizable by the NM system, places the message in a buffer, and forwards the message to the NM system. The NM system receives the message and sends an acknowledgment (ACK) message to the proxy. When the proxy receives the ACK message, an ACK process is initiated. The ACK process removes the message from the buffer.

The proxy can maintain a finite number of buffers, each of which is of a fixed size. For example, in the proxy used by Alcatel's 5523 EM system, up to 100 buffers can be maintained, each of which can store up to 556 port status changes (the smallest sized messages). The NM system processes messages at a maximum rate. Given these two constraints, it is possible for the buffers to overflow if messages are being generated by the network elements and by the EM system at a rate faster than the NM system can process the messages. If the buffers overflow, messages are lost. Since the messages contain status and configuration information of the network elements, lost messages mean the NM system no longer has accurate knowledge of the state of the network. The proxy clears all the buffers and notifies the NM system, which initiates a reconciliation of the network.

In networks having 250 nodes, it can take from 12 to 18 hours to reconcile the network. Larger networks take even longer to reconcile. It is therefore highly desirable to avoid the need to reconcile a network, that is, to avoid overflow of the buffers within the proxy.

U.S. Pat. No. 6,363,421 teaches a method of limiting exchanges of messages using a rate based approach. Messaging is limited to a fixed maximum rate, and messages are sent based on a prioritization. Although this method would prevent overflow of NMS processing, use of a fixed maximum rate is inflexible. For example, if only a single client is sending messages at a given point in time, that single client can only send messages at a rate up to the fixed maximum rate, even though the NMS could in fact process messages at a faster rate.

U.S. Patent Application 20020120730 teaches throttling of messages to an NMS by authorizing the transmission of messages in batches. The NMS authorizes an agent system to send a configured number of messages. Once these messages have been sent by the agent system, the agent system waits for a new authorization, which will be sent by the NMS once it has received the first batch of messages.

U.S. Patent Application 20020116485 teaches a method of throttling messages between NMS clients and servers, using an out-of-band channel to send messages between the clients and the servers. Message throttling is accomplished by polling and by acknowledgment windowing. A configured number of messages are sent to the NMS, and then an acknowledgment is required before more messages are sent.

These methods are limiting in that either complicated polling and windowing communication between the EM systems and the NM system are needed, or the transmission size is fixed and inflexible. A method of throttling event messages by placing backpressure on the EM systems without interfering adding to communications between the EM systems and the NM system would allow graceful degradation of performance as the buffers fill, without limiting the communications with the NM system.

SUMMARY OF THE INVENTION

In accordance with one aspect of the invention, a method is provided for throttling event messages to be forwarded from an element management system (EMS) to a network management system (NMS). The EMS includes a Qs channel process for communicating with the NMS. A set of at least one proxy buffer is maintained at the Qs channel process, the set having a fill level. When an event message associated with a network element is received, it is determined from at least the fill level whether the event message is to be forwarded. This is determined at a point separate from the Qs channel process. If the event message is to be forwarded, the event message is forwarded to the Qs channel process for storage in the at least one proxy buffer.

In one embodiment, the event message has a priority which is either low or high, and the set of at least one proxy buffer has a state, the state being variable, being reflective of the fill level, and being at any point in time one of Low, High, or Full. If the state is Low, it is determined that the event message is to be forwarded. If the state is High and the event message has a high priority, it is determined that the event message is to be forwarded. If the state is High and the event message has a low priority, it is determined that the event message is not to be forwarded. If the state is Full, it is determined that the event message is not to be forwarded.

The state of the set of at least one proxy buffer may be defined by threshold crossing of the fill level. Four thresholds are provided, being related by either the expression $$T_{HL} \leq T_{LH} < T_{FH} \leq T_{HF},$$

or the expression $$T_{HL} < T_{LH} < T_{FH} < T_{HF}$$

if a hysteresis effect is desired. If the fill level of the set rises to or above the first threshold $T_{LH}$, the state is set to High. If the fill level of the set rises to or above a the second $T_{HF}$, the state is set to Full. If the fill level of the set falls to or below the third threshold $T_{FH}$, the state is set to High. If the fill level of the set falls to or below the fourth threshold $T_{HL}$, the state is set to Low.

An EMS is also provided, having a Qs channel process and an event logger for implementing the methods of the invention. Computer-readable media are provided for storing instructions for implementing the methods of the invention.

The methods and apparatus of the present invention allow throttling of event messages without burdening the Qs channel process. The proxy, responsible for the Qs channel process, merely monitors for fill levels of its buffers crossing thresholds. When a threshold is crossed, the proxy sends a callback message to the event logger. The event logger maintains a state of the proxy buffers, and determines whether to forward event messages to the proxy based on this state. The buffers at the proxy do not overflow, and the proxy is able to exchange messages with the NMS without being burdened by throttling tasks. Any buffer overflow which does occur happens at the event loggers, where event messages are buffered by network element, and if a buffer overflows only one or a few number of network elements need to be reconciled.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
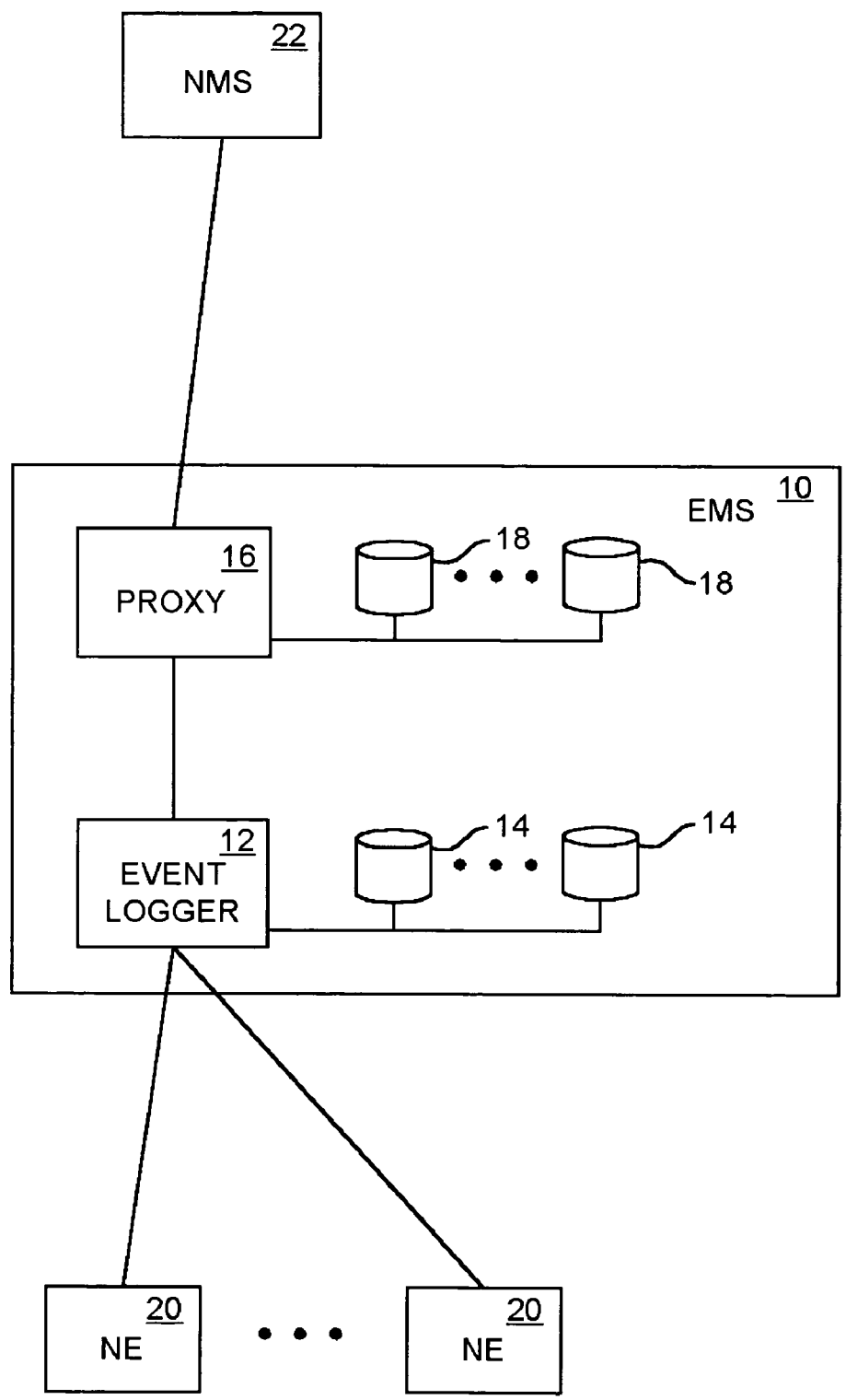
FIG. 1 is a block diagram of a portion of a telecommunication network according to one embodiment of the invention.

Referring to FIG. 1, a block diagram of a portion of a telecommunication network according to one embodiment of the invention is shown. An Element Management System (EMS) 10 includes an event logger 12, which maintains a plurality of local buffers 14. The EMS 10 also includes a proxy 16 in communication with the event logger 12, and which maintains at least one fixed size proxy buffer 18, the number of proxy buffers being configurable. The proxy 16 includes the Qs channel process discussed elsewhere herein. The event logger 12 is in communication with a plurality of network elements 20 for which the EMS is responsible. Each local buffer 14 maintained by the event logger 12 corresponds to a respective one of the network elements 20. More generally, there is at least one event logger within the EMS, each event logger being in communication with a unique set of at least one network element. Each event logger maintains its own set of local buffers. However, there is only one proxy 16, and each event logger communicates with the proxy 16. The invention will be described with respect to an EMS having only one event logger, but it is to be understood that the functionality of the event logger described below also applies to any additional event loggers at the EMS.

The proxy 16 is in communication with a Network Management System (NMS) 22. The NMS is generally in communication with additional EMSs (not shown in FIG. 1) via respective proxies, and is responsible for managing all of the network elements for which each of the EMSs is responsible.

The EMS 10 may be a single computing platform, or may be a distributed system. For example, the proxy 16 may be located on a separate computing platform from the event logger 12. The event logger 12 and the proxy 16 comprise instructions for carrying out the methods of the invention described below. These instructions are preferably in the form of software loaded into memory of one or more processors. Alternatively, the instructions may be in the form of circuits, possibly within a processor (including a microprocessor) or distributed within a plurality of processors. Generally, the instructions may be in the form of any combination of software and hardware. If software, the instructions may be stored on a computer-readable medium.

Broadly, as the amount of data in the proxy buffers 18 rises and falls past configured thresholds, the proxy 16 sends call back messages to the event logger 12 indicating a state of the proxy buffers. The proxy buffers can be in one of three states: low, high, and full. The event logger 12 keeps track of the state of the proxy based the call back messages received from the proxy. The event logger 12 receives event messages from the network elements 20 and for each event message received determines whether to queue the event message within the respective local buffer 14, to forward the event message to the proxy, or to discard the event message and place the respective network element out of sync. The event logger makes this determination based on the state of the proxy, which indicates how close the proxy buffers are to overflowing. In this way, the throttling process (determination of whether to send event messages to the Qs channel process) is separated from the Qs channel process.

Figure 2:
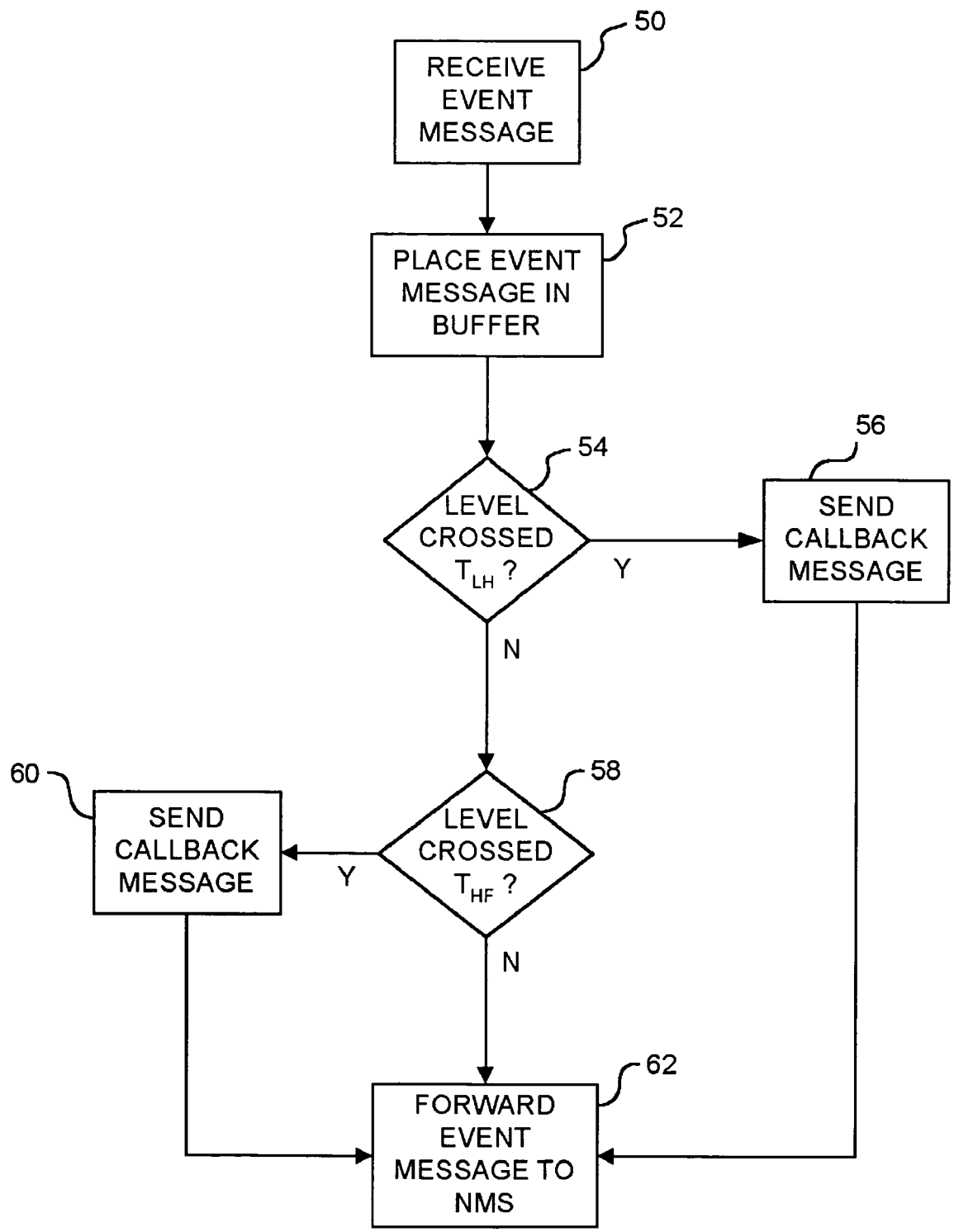
FIG. 2 is a flowchart of a method carried out by the proxy of FIG. 1 upon receipt of an event message according to one embodiment of the invention.

Referring to FIG. 2, a flowchart of a method carried out by the proxy 16 upon receipt of an event message according to one embodiment of the invention is shown. At step 50 the proxy receives an event message from the event logger. At step 52 the proxy places the event message into one of the proxy buffers 18. The proxy then determines at step 54 whether the addition of the event message into the proxy buffers caused the fill-level of the buffers to cross a low-high threshold $T_{LH}$. If so, the proxy buffers have entered into the high state, and the proxy 16 sends a call back message to the event logger at step 56 indicating that the state of the proxy buffers has entered the high state.

If the proxy determines that the fill-level has not crossed the low-high threshold $T_{LH}$ then the proxy determines at step 58 whether the addition of the event message into the proxy buffers caused the fill-level of the buffers to cross a high-full threshold $T_{HF}$. If so, the proxy buffers have entered into the full state, and the proxy 16 sends a call back message to the event logger at step 60 indicating that the state of the proxy buffers has entered the full state. Once the appropriate call back message has been sent to the event logger, or if the fill-level did not cross either the low-high threshold or the high-full threshold, the proxy forwards the event message to the NMS at step 62.

Figure 3:
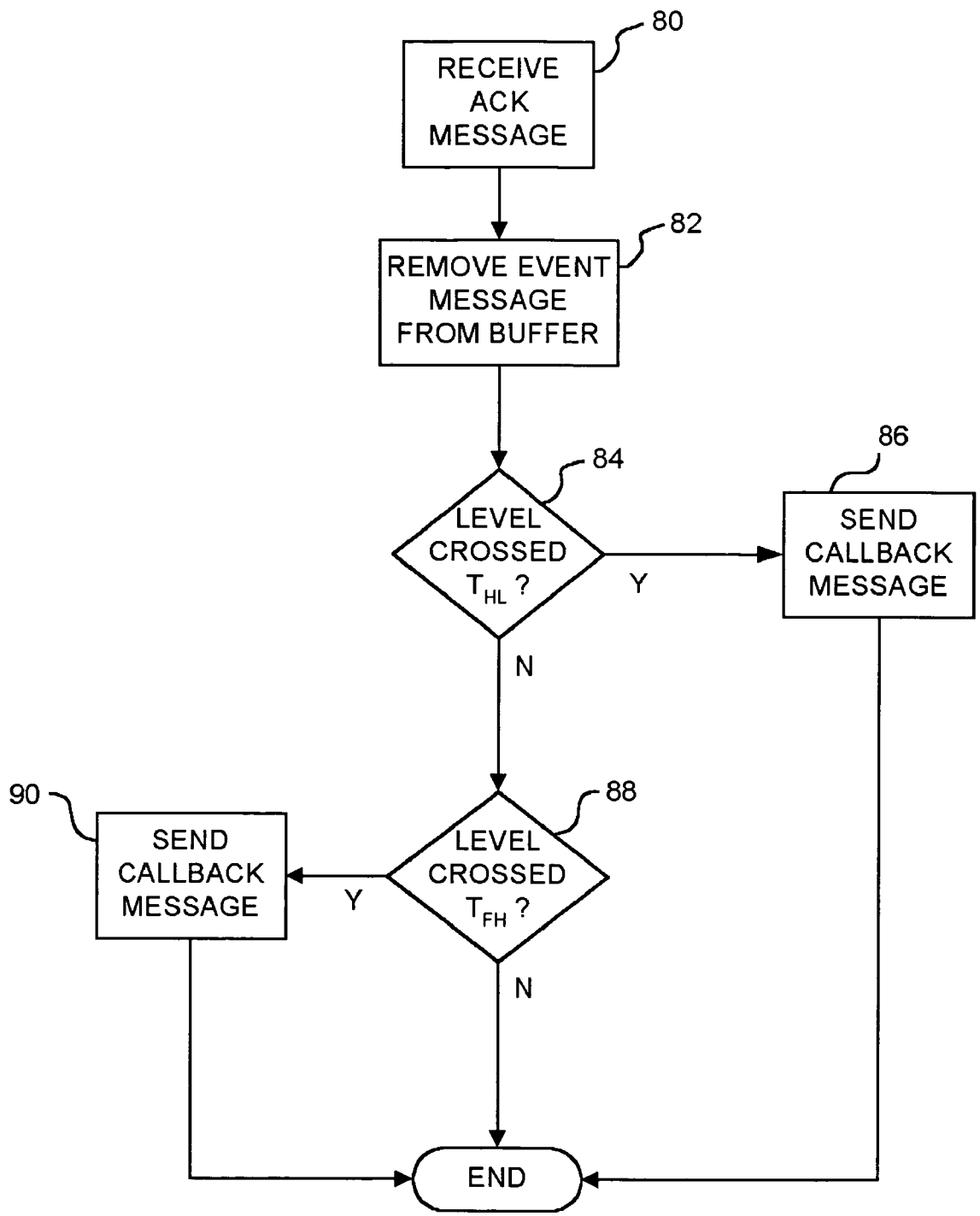
FIG. 3 is a flowchart of a method carried out by the proxy of FIG. 1 upon receipt of an acknowledgment message according to one embodiment of the invention.

Referring to FIG. 3, a flowchart of a method carried out by the proxy 16 upon receipt of an acknowledgment message according to one embodiment of the invention is shown. At step 80 the proxy receives an acknowledgment message from the NMS, indicating that a specified event message has been successfully forwarded to the NMS. At step 82 the proxy removes the event message from the proxy buffers 18. The proxy then determines at step 84 whether the removal of the event message from the proxy buffers caused the fill-level of the buffers to cross a high-low threshold $T_{HL}$. If so, the proxy buffers have entered into the low state, and the proxy 16 sends a call back message to the event logger at step 86 indicating that the state of the proxy buffers has entered the low state.

If the proxy determines that the fill-level has not crossed the high-low threshold $T_{HL}$ then the proxy determines at step 88 whether the removal of the event message from the proxy buffers caused the fill-level of the buffers to cross a full-high threshold $T_{FH}$. If so, the proxy buffers have entered into the high state, and the proxy 16 sends a call back message to the event logger at step 90 indicating that the state of the proxy buffers has entered the high state.

Figure 4:
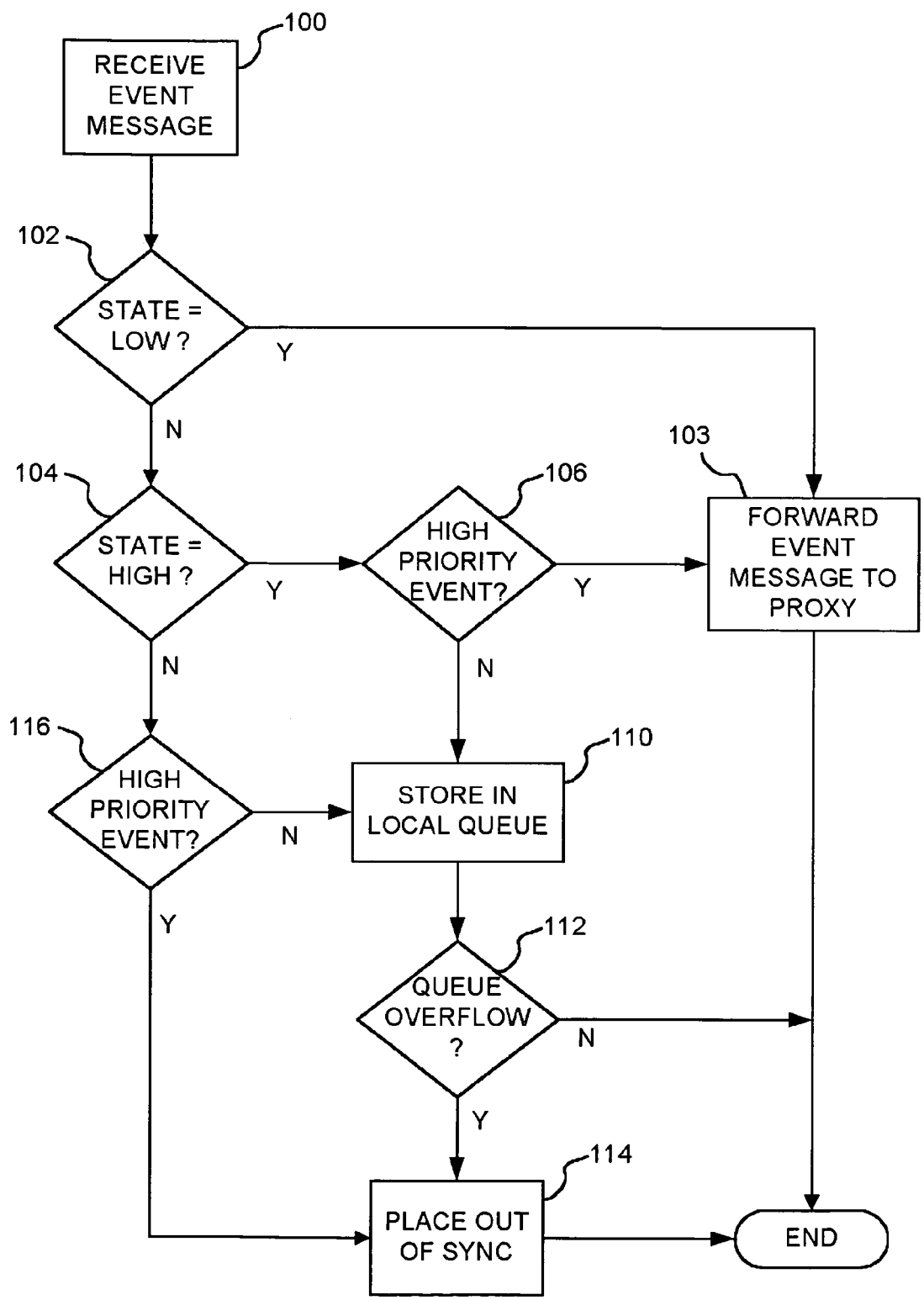
FIG. 4 is a flowchart of a method carried out by the event logger of FIG. 1 upon receipt of an event message according to one embodiment of the invention.

As the event logger receives the call back messages from proxy, it adjusts its stored state of the proxy buffers. Referring to FIG. 4, a flowchart of a method carried out by the event logger upon receipt of an event message from a network element according to one embodiment of the invention is shown. At step 100 the event logger receives an event message from a network element. The event message may also be generated by the EMS itself, but will still be associated with a network element. At step 102 the event logger determines whether the stored state of the proxy buffers is low. A low state indicates that the proxy buffers have plenty of room to store additional event messages, so if the stored state is low then the event logger sends the event message to the proxy at step 103.

If the stored state is not low, the event logger determines whether the stored state of the proxy buffers is high. A high state indicates that the fill-levels of the proxy buffers are approaching maximum capacity. In such a situation, only the most urgent messages should be sent to the proxy. If the stored state is high, then at step 106 the event logger determines whether the event message is a high priority event. High priority event messages include node creation messages, node deletion messages, service notification messages, and other messages from the EMS to indicate success or failure of an operation requested by the NMS. Sending such high priority event messages to the proxy even when the proxy buffers are in the high state is acceptable because the frequency of these event messages is much lower than of other event messages received from the network elements. Accordingly, if the event logger determines at step 106 that the event message is a high priority event message, the event logger sends the event message to the proxy at step 103.

If the event logger determines at step 106 that the event message is not a high priority event, then at step 110 the event logger stores the event message into the local queue 14 corresponding to the network element 20 from which the event message arrived. The event logger determines at step 112 whether the local queue has overflowed after storing the event message therein. If the local queue has overflowed, then at step 114 the event logger places the network element corresponding to the overflowed local queue out of sync, and notifies the NMS of such.

If the event logger determines at step 104 that the stored state of the proxy buffer is not high, then the stored state is full. As such, there is no more room in the proxy buffers for event messages of any sort. At step 116 the event logger determines whether the event message is a high priority event message, as described above with reference to step 106. If the event message is not a high priority event message then at step 110 the event logger places the event message in the local queue corresponding to the network element from which the event message was received. If the event message was a high priority event message however, the event message contains information which is crucial to for the NMS to understand the state of the network. If the event message was determined to be a high priority event message at step 116 then the event logger places the network element from which the event message was received or for which the EMS generated the event message out of sync at step 114 and notifies the NMS of such.

The low-high threshold $T_{LH}$ determines when the state of the proxy buffers changes from low to high as the buffers fill. The high-low threshold $T_{HL}$ determines when the state of the proxy buffers changes from high to low as the buffers empty. In order to provide a hysteresis effect, the low-high threshold is preferably higher than the high-low threshold, but in any event must not be lower than high-low threshold. Similarly, the high-full threshold $T_{HF}$ determines when the state of the proxy buffers changes from high to full as the buffers fill. The full-high threshold $T_{FH}$ determines when the state of the proxy buffers changes from full to high as the buffers empty. In order to provide a hysteresis effect, the high-full threshold is preferably higher than the full-high threshold, but in any event must not be lower than the full-high threshold. In general, $$T_{HL} \leq T_{LH} < T_{FH} \leq T_{HF}.$$

Example values are $T_{HL}$=50%, $T_{LH}$=75%, $T_{FH}$=98%, and $T_{HF}$=100%. Of course the thresholds can also be expressed in absolute values, given a maximum capacity of the proxy buffers.

The invention has been described with the call back messages sent from the proxy to the event logger indicating what state the proxy buffers are in. Alternatively, the call back messages could simply indicate which threshold have been crossed, and the event logger then determines the new state the proxy buffers from the identification of the threshold crossed. Generally, the proxy and the event logger can maintain statuses and exchange information in any way which allows the event logger receive an indication, either direct or indirect, of the state of the proxy buffers.

The embodiments presented are exemplary only and persons skilled in the art would appreciate that variations to the embodiments described above may be made without departing from the spirit of the invention. For example, methods which are logically equivalent to the methods described above with reference to FIG. 2, FIG. 3, and FIG. 4 may be used. The scope of the invention is solely defined by the appended claims.

We claim:

1. A method of throttling event messages to be forwarded from an element management system (EMS) to a network management system (NMS), the EMS including a Qs channel process for communicating with the NMS, the method comprising the steps of:

maintaining a set of at least one proxy buffer at the Qs channel process, the set having a fill level;

receiving an event message associated with a network element;

at a point separate from the Qs channel process, determining from at least the fill level whether the event message is to be forwarded; and if the event message is to be forwarded, forwarding the event message to the Qs channel process for storage in the at least one proxy buffer, wherein the event message has a priority which is either low or high, wherein the set of at least one proxy buffer has a state, the state being variable, being reflective of the fill level, and being at any point in time one of Low, High, or Full, and wherein determining whether the event message is to be forwarded comprises:

if the state is Low, determining that the event message is to be forwarded;

if the state is High and the event message has a high priority, determining that the event message is to be forwarded;

if the state is High and the event message has a low priority, determining that the event message is not to be forwarded; and if the state is Full, determining that the event message is not to be forwarded.

2. The method of claim 1 comprising the further steps of:

if the event message is not to be forwarded and the event message has a high priority, placing the network element out of sync; and if the event message has a low priority;

storing the event message in a local buffer associated with the network element;

determining whether the local buffer has overflowed; and if the local buffer has overflowed, placing the network element out of sync.

3. The method of claim 1 comprising the further steps of:

if the fill level of the set rises to or above a first threshold $T_{LH}$, setting the state to High;

if the fill level of the set rises to or above a second threshold $T_{HF}$, setting the state to Full;

if the fill level of the set falls to or below a third threshold $T_{FH}$, setting the state to High; and if the fill level of the set falls to or below a fourth threshold $T_{HL}$, setting the state to Low;

wherein the thresholds have values satisfying the relationship $$T_{HL} \leq T_{LH} < T_{FH} \leq T_{HF}.$$

4. The method of claim 3 wherein the thresholds have values satisfying the relationship $$T_{HL} < T_{LH} < T_{FH} < T_{HF},$$

thereby providing a hysteresis effect.

5. An element management system (EMS) for forwarding event messages to a network management system (NMS), comprising:

a Qs channel process for communicating with the NMS;

a set of at least one proxy buffer maintained by the Qs channel process, the set having a fill level;

an event logger for receiving an event message associated with a network element, for determining from at least the fill level whether the event message is to be forwarded, and for forwarding the event message to the Qs channel process for storage in the at least one proxy buffer in the event that the event message is to be forwarded, wherein the event logger is adapted to maintain a state of the at least one proxy buffer, the state being variable, being reflective of the fill level, and being at any point in time one of Low, High, or Full, wherein the event message has a priority which is either high or low, and wherein the event logger comprises:

instructions for determining that the event message is to be forwarded, in the event that the state is Low;

instructions for determining that the event message is to be forwarded, in the event that the state is High and the event message has a high priority;

instructions for determining that the event message is not to be forwarded, in the event that the state is High and the event message has a low priority; and instructions for determining that the event message is not to be forwarded, in the event that the state is Full.

6. The EMS of claim 5 wherein the Qs channel process comprises:

instructions for determining whether the fill level crosses one of four configurable thresholds; and instructions for sending a callback message to the event logger indicative of which threshold was crossed by the fill level, in the event that the fill level crosses one of the thresholds.

7. The EMS of claim 6 wherein the event logger further comprises:

instructions for setting the state to High, in the event that the callback message is indicative of the fill level rising to or above the first threshold $T_{LH}$;

instructions for setting the state to Full, in the event that the callback message is indicative of the fill level rising to or above the second threshold $T_{HF}$;

instructions for setting the state to High, in the event that the callback message is indicative of the fill level falling to or below the third threshold $T_{HL}$; and instructions for setting the state to Low, in the event that the callback message is indicative of the fill level falling to or below the fourth threshold $T_{HL}$; wherein the thresholds have values satisfying the relationship $$T_{HL} \leq T_{LH} < T_{FH} \leq T_{HF}.$$

8. The EMS of claim 7 wherein the thresholds have values satisfying the relationship $$T_{HL} < T_{LH} < T_{FH} < T_{HF},$$

thereby providing a hysteresis effect.

9. The EMS of claim 5 wherein the Qs channel process comprises:

instructions for determining whether the fill level crosses one of four configurable thresholds;

instructions for determining the state of the set, in the event that the fill level crosses one of the four configurable thresholds; and instructions for sending a callback message to the event logger indicative of the state, in the event that the fill level crosses one of the thresholds.

10. The EMS of claim 9 wherein the instructions for determining the state of the set comprise:

instructions for setting the state to High, in the event that the fill level rises to or above the first threshold $T_{LH}$;

instructions for setting the state to Full, in the event that the fill level rises to or above the second threshold $T_{HF}$;

instructions for setting the state to High, in the event that the fill level falls to or below the third threshold $T_{FH}$; and instructions for setting the state to Low, in the event that the fill level falls to or below the fourth threshold $T_{HL}$;

wherein the thresholds have values satisfying the relationship $$T_{HL} \leq T_{LH} < T_{FH} \leq T_{HF}.$$

11. The EMS of claim 10 wherein the thresholds have values satisfying the relationship $$T_{HL} < T_{LH} < T_{FH} < T_{HF},$$

thereby providing a hysteresis effect.

12. A method of monitoring a fill level of a set of at least one proxy buffer at a Qs channel process responsible for forwarding event messages from an element management system (EMS) to a network management system (NMS), comprising the steps of:
configuring a first threshold $T_{LH}$, a second threshold $T_{HF}$, a third threshold $T_{FH}$, and a fourth threshold $T_{HL}$ the thresholds having values satisfying the relationship $T_{HL} \leq T_{LH} < T_{FH} \leq T_{HF}$;

upon receipt of an event message from the EMS:
forwarding the event message to the NMS;
adding the event message to the set; and
determining whether addition of the event message to the set caused the fill level of the set to rise to or above either the first threshold or the second threshold;
upon receipt of an acknowledgment message from the EMS:
deleting an event message corresponding to the acknowledgment from the set; and
determining whether deletion of the event message from the set caused the fill level of the set to fall to or below either the third threshold or the fourth threshold; and
if addition of the event message to the set caused the fill level of the set to rise to or above either the first threshold or the second threshold, or if deletion of the event message from the set caused the fill level of the set to fall to or below either the third threshold or the fourth threshold, sending a callback message to an event logger in the EMS indicative of which threshold has been crossed by the fill level.

13. The method of claim 12 wherein the step of sending a callback message to the event logger indicates which threshold was crossed by the fill level.

14. The method of claim 12 further comprising the steps of:
defining a state of the set of at least one proxy buffer, the state being variable and being at any point in time one of Low, High, or Full;
if the fill level rises to or above the first threshold, setting the state to High;
if the fill level rises to or above the second threshold, setting the state to Full;
if the fill level falls to or below the third threshold, setting the state to High;
if the fill level falls to or below the fourth threshold, setting the state to Low;
and wherein the step of sending a callback message to the event logger indicates the state of the set.

15. The method of claim 14 wherein the thresholds have values satisfying the relationship $T_{HL} < T_{LH} < T_{FH} < T_{HF}$, thereby providing a hysteresis effect.

16. A computer-readable medium storing software for monitoring a fill level of a set of at least one proxy buffer at a Qs channel process responsible for forwarding event messages from an element management system (EMS) to a network management system (NMS), the computer-readable medium comprising:
instructions for configuring a first threshold $T_{LH}$, a second threshold $T_{HF}$, a third threshold $T_{FH}$, and a fourth threshold $T_{HL}$, the thresholds having values satisfying the relationship $T_{HL} \leq T_{LH} < T_{FH} \leq T_{HF}$;

instructions for forwarding an event message to the NMS upon receipt of the event message from the EMS;
instructions for adding the event message to the set upon receipt of the event message from the EMS;
instructions for determining whether addition of the event message to the set caused the fill level of the set to rise to or above either the first threshold or the second threshold, upon addition of an event message to the set;
instructions for deleting an event message corresponding to an acknowledgment from the set, upon receipt of an acknowledgment message from the EMS;
instructions for determining whether deletion of the event message from the set caused the fill level of the set to fall to or below either the third threshold or the fourth threshold, upon deletion of an event message from the set;
instructions for sending a callback message to an event logger in the EMS indicative of which threshold has been crossed by the fill level, in the event that addition of the event message to the set caused the fill level of the set to rise to or above either the first threshold or the second threshold, or that deletion of the event message from the set caused the fill level of the set to fall to or below either the third threshold or the fourth threshold.

17. A method of throttling event messages at an element management system (EMS), the EMS including a Qs channel process for communicating with a network management system (NMS) and for maintaining a set of a plurality of proxy buffers collectively having a fill level, the method comprising the steps of:
intermittently receiving from the Qs channel process a callback message indicative of the fill level;
receiving an event message associated with a network element;
determining from at least the fill level whether the event message is to be forwarded;
if the event message is to be forwarded, forwarding the event message to the Qs channel process for storage in the set of at least one proxy buffer; and
the step of storing a state of the set, the state being variable, reflective of the fill level, and being at any point in time one of Low, High, and Full, wherein the callback message is indicative of the state, wherein the event message has a priority which is either high or low, and wherein the step of determining whether the event message is to be forwarded comprises the steps of:
if the state is Low, determining that the event message is to be forwarded;
if the state is High and the event message has a high priority, determining that the event message is to be forwarded;
if the state is High and the event message has a low priority, determining that the event message is not to be forwarded; and
if the state is Full, determining that the event message is not to be forwarded.

18. The method of claim 17 comprising the further steps of:
if the event message is not to be forwarded and the event message has a high priority, placing the network element out of sync; and
if the event message has a low priority:
storing the event message in a local buffer associated with the network element;
determining whether the local buffer has overflowed; and
if the local buffer has overflowed, placing the network element out of sync.

19. The method of claim 17 wherein the callback message indicates which one of four configured thresholds has been crossed by the fill level, and comprising the further steps of:
if the fill level has risen to or above the first threshold $T_{LH}$, setting the state to High;
if the fill level has risen to or above the second threshold $T_{HF}$, setting the state to Full;

if the fill level falls to or below the third threshold $T_{FH}$, setting the state to High;

if the fill level falls to or below the fourth threshold $T_{HL}$, setting the state to Low; and wherein the thresholds satisfy the relationship $$T_{HL} \leq T_{LH} < T_{FH} \leq T_{HF}.$$

20. The method of claim 19 wherein the thresholds satisfy the relationship $$T_{HL} < T_{LH} < T_{FH} < T_{HF},$$

thereby providing a hysteresis effect.

* * * * *